US012647505B2

(12) United States Patent
Xu

(10) Patent No.: US 12,647,505 B2
(45) Date of Patent: Jun. 2, 2026

(54) SCREEN-PROJECTION CONTENT DISPLAY METHOD AND APPARATUS, AND TERMINAL AND STORAGE MEDIUM

(71) Applicant: GUANGDONG OPPO MOBILE TELECOMMUNICATIONS CORP., LTD., Dongguan (CN)

(72) Inventor: Weinan Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 400 days.

(21) Appl. No.: 18/350,832

(22) Filed: Jul. 12, 2023

(65) Prior Publication Data

US 2023/0353669 A1     Nov. 2, 2023

Related U.S. Application Data

(63) Continuation of application No. PCT/CN2021/135478, filed on Dec. 3, 2021.

(30) Foreign Application Priority Data

Jan. 18, 2021     (CN) .......................... 202110062588.3

(51) Int. Cl.
*H04M 1/72412*          (2021.01)
*G06F 3/14*             (2006.01)

(52) U.S. Cl.
CPC ...... *H04M 1/72412* (2021.01); *G06F 3/1423* (2013.01); *H04M 2201/38* (2013.01)

(58) Field of Classification Search
CPC .......... H04M 1/72412; H04M 2201/38; G06F 3/1423; Y02D 30/70; H04N 21/41;

(Continued)

(56) References Cited

U.S. PATENT DOCUMENTS

2010/0051772 A1* 3/2010 Sakamaki .............. F16M 13/02
                                                    403/164
2015/0067516 A1* 3/2015 Park ...................... G06F 3/0304
                                                    715/728

(Continued)

FOREIGN PATENT DOCUMENTS

CN          103477630 A      12/2013
CN          103634651 A       3/2014

(Continued)

OTHER PUBLICATIONS

International Search Report, International Application No. PCT/ CN2021/135478, mailed Mar. 1, 2022 (15 pages).

(Continued)

*Primary Examiner* — Santiago Garcia

(74) *Attorney, Agent, or Firm* — Ladas & Parry LLP

(57)          ABSTRACT

Disclosed are a screen-projection content display method and apparatus, and a terminal and a storage medium, which belong to the technical field of computers. In the present application, a screen-projection receiver first displays screen-projection content in a window and is then instructed to display the screen-projection content in a designated area, wherein the designated area and the window are different areas; and upon receiving content sent by a screen-projection initiator, the screen-projection receiver can perform display in such a way that the currently displayed content is less influenced, thereby optimizing the display effect of the screen-projection content.

20 Claims, 7 Drawing Sheets

(58) Field of Classification Search
CPC .. H04N 21/431; H04N 21/436; H04N 21/439; H04N 21/443; H04N 21/4316; H04N 21/4122; H04N 21/4126; H04N 21/4438
See application file for complete search history.

(56) References Cited

U.S. PATENT DOCUMENTS

| | | | | |
|---|---|---|---|---|
| 2021/0182013 A1* | 6/2021 | Guo | .................. | H04N 21/25808 |
| 2022/0072433 A1* | 3/2022 | Wang | ................. | H04N 21/4854 |
| 2022/0300153 A1* | 9/2022 | Gu | ......................... | G06F 3/1454 |
| 2023/0139932 A1* | 5/2023 | Xia | ....................... | G06F 3/1423 |
| | | | | 715/734 |
| 2023/0342105 A1* | 10/2023 | He | ......................... | G06F 3/1454 |
| 2024/0012503 A1* | 1/2024 | Li | ...................... | H04N 21/4122 |

FOREIGN PATENT DOCUMENTS

| | | |
|---|---|---|
| CN | 105955689 A | 9/2016 |
| CN | 106528021 A | 3/2017 |
| CN | 103634651 B | 3/2019 |
| CN | 110362373 A | 10/2019 |
| CN | 110475135 A | 11/2019 |
| CN | 111131866 A | 5/2020 |
| CN | 111158543 A | 5/2020 |
| CN | 111601120 A | 8/2020 |
| CN | 111813362 A | 10/2020 |
| CN | 111880757 A | 11/2020 |
| JP | 2002023719 A | 1/2002 |
| JP | 2012099940 A | 5/2012 |
| KR | 20140108480 A | 9/2014 |
| WO | 2017173793 A1 | 10/2017 |

OTHER PUBLICATIONS

Chinese First Office Action, Chinese Application No. 202110062588.3, mailed Nov. 22, 2022 (20 pages).
Notification to Grant Patent Right for Invention, Chinese Application No. 202110062588.3 , mailed Apr. 27, 2023 (7 pages).

* cited by examiner

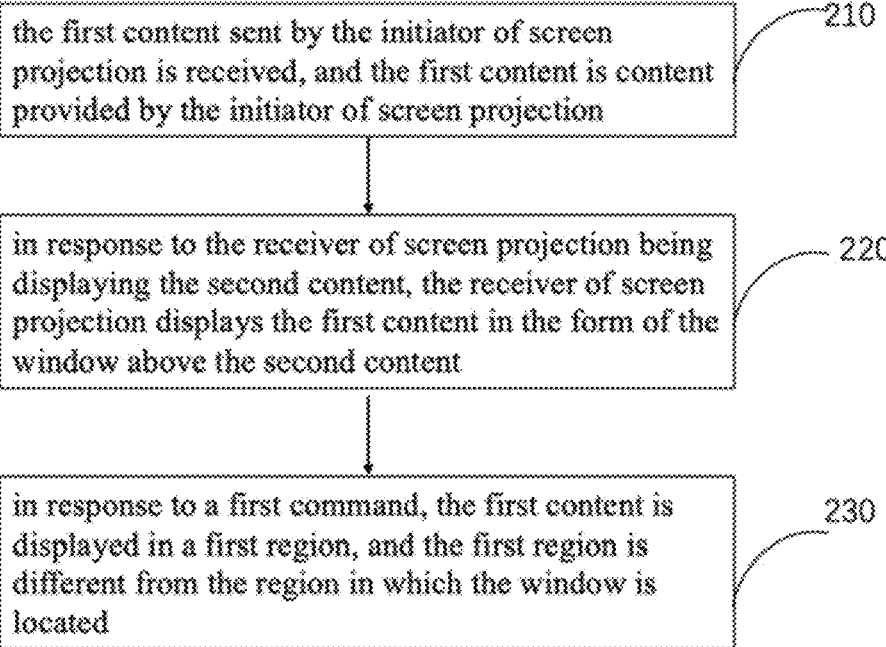

the first content sent by the initiator of screen projection is received, and the first content is content provided by the initiator of screen projection ⟋210 in response to the receiver of screen projection being displaying the second content, the receiver of screen projection displays the first content in the form of the window above the second content — 220 in response to a first command, the first content is displayed in a first region, and the first region is different from the region in which the window is located ⟋230

FIG. 2

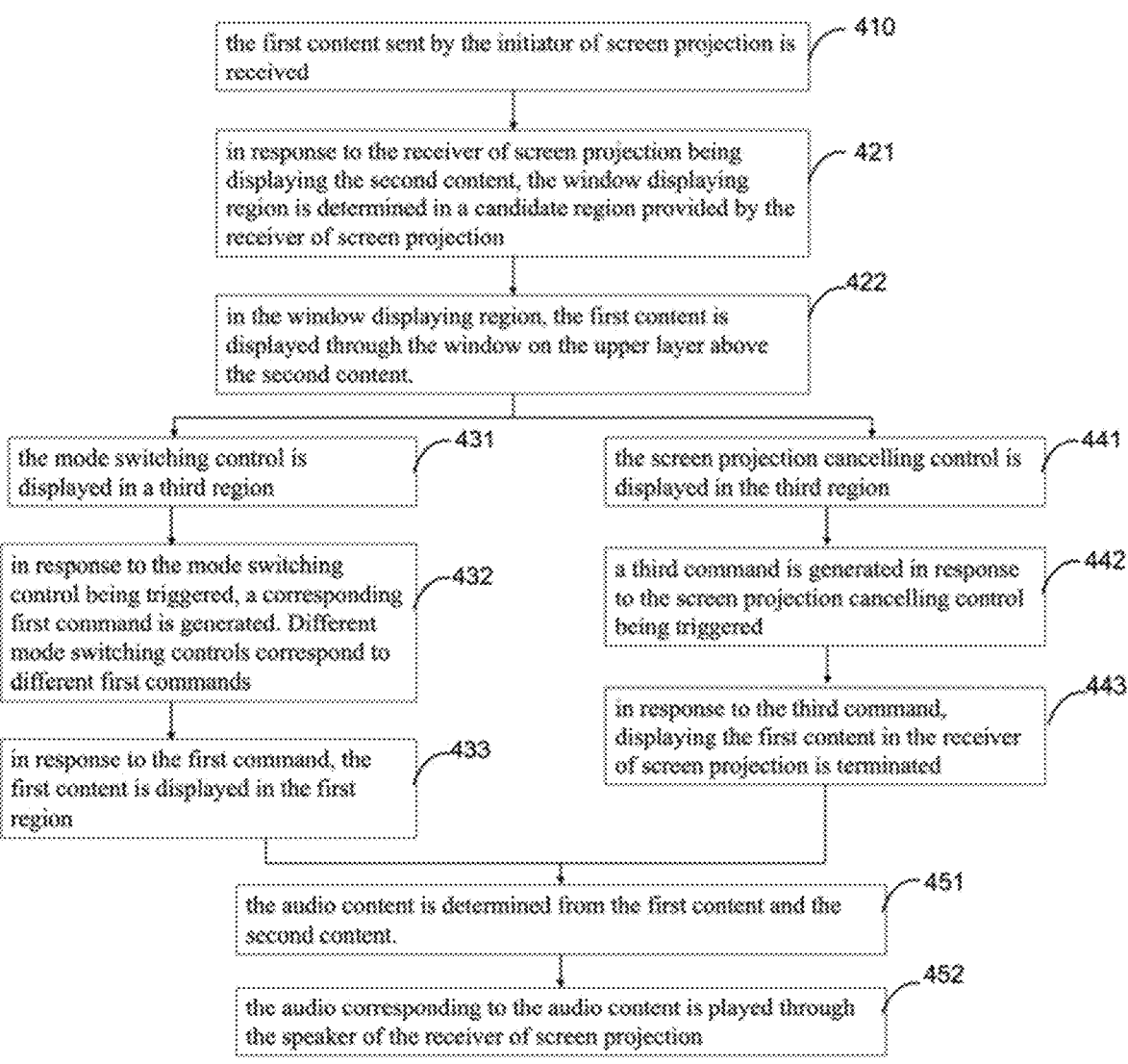

the first content sent by the initiator of screen projection is received — 410 in response to the receiver of screen projection being displaying the second content, the window displaying region is determined in a candidate region provided by the receiver of screen projection — 421 in the window displaying region, the first content is displayed through the window on the upper layer above the second content. — 422 the mode switching control is displayed in a third region — 431 in response to the mode switching control being triggered, a corresponding first command is generated. Different mode switching controls correspond to different first commands — 432 in response to the first command, the first content is displayed in the first region — 433 the screen projection cancelling control is displayed in the third region — 441 a third command is generated in response to the screen projection cancelling control being triggered — 442 in response to the third command, displaying the first content in the receiver of screen projection is terminated — 443 the audio content is determined from the first content and the second content. — 451 the audio corresponding to the audio content is played through the speaker of the receiver of screen projection — 452

FIG. 4

SCREEN-PROJECTION CONTENT DISPLAY METHOD AND APPARATUS, AND TERMINAL AND STORAGE MEDIUM

CROSS REFERENCE TO RELATED APPLICATIONS

The present application is a continuation application of the international patent application No. PCT/CN2021/135478, filed on Dec. 3, 2021, which claims the Chinese patent application No. 202110062588.3, filed on Jan. 18, 2021, and contents of which are incorporated herein by its entireties.

TECHNICAL FIELD

The present disclosure relates to the field of computers, and in particular to a method of displaying content of screen projection, and an apparatus, a terminal, and a storage medium.

BACKGROUND

As screen projection develops, a user may be able to project content from a mobile terminal of the user to a large screen, such as a TV or a computer monitor, to improve a viewing effect.

In the art, when the user successfully projects the content from the mobile terminal to the large screen, such as the TV or the computer monitor, the large screen may take the entire screen to display the content of the mobile terminal.

SUMMARY OF THE DISCLOSURE

The present disclosure provides a method of displaying content of screen projection, and an apparatus, a terminal, and a storage medium. Technical solutions are as follows.

According to an aspect, a method of displaying content of screen projection, performed by a receiver of screen projection, and the method includes:

receiving first content sent by an initiator of screen projection, wherein the first content is content provided by the initiator of screen projection;

displaying the first content in a form of a window above second content in response to the receiver of screen projection being displaying the second content; and displaying the first content in a first region in response to a first command, wherein the first region is different from a region in which the window is located.

According to another aspect, a terminal includes a processor, a memory connected to the processor, and program instructions stored on the memory. The processor is configured to perform, when executing the program instructions, the method of displaying content of screen projection as described in each aspect of the present disclosure.

According to another aspect, a non-transitory computer-readable storage medium, storing computer instructions. The program instructions are configured to implement, when being executed by a processor, the method of displaying content of screen projection as described in each aspect of the present disclosure.

BRIEF DESCRIPTION OF THE DRAWINGS

In order to illustrate technical solutions in the embodiments of the present disclosure more clearly, the accompanying drawings used for describing the embodiments of the present disclosure will be described in the following briefly. Obviously, the following accompanying drawings show only some of the embodiments of the present disclosure, and any ordinary skilled person in the art may obtain other drawings without any creative effort.

FIG. 2 is a flow chart of the method of displaying content of the screen projection according to an embodiment of the present disclosure.

FIG. 4 is a flow chart of the method of displaying content of the screen projection according to another embodiment of the present disclosure.

DETAILED DESCRIPTION

Figure 1:
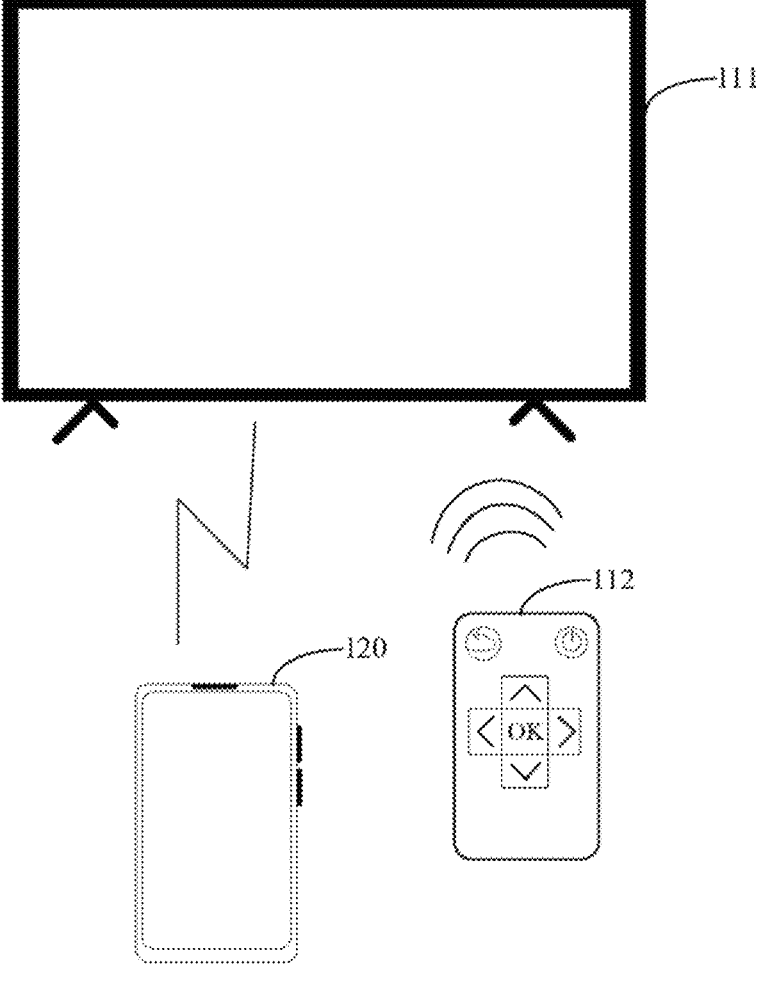
FIG. 1 is a schematic view of a scenario of performing the method of displaying content of the screen projection according to an embodiment of the present disclosure.

In order to make the objective, technical solutions and advantages of the present disclosure clearer, embodiments of the present disclosure will be described in further detail below by referring to the accompanying drawings.

When the following description relates to the accompanying drawings, same numerals in various accompanying drawings indicate same or similar elements unless otherwise indicated. The implementations described in the following exemplary embodiments do not represent all embodiments that are consistent with the present disclosure. Rather, the described implementations are only examples of devices and methods that are consistent with some aspects of the present disclosure as detailed in the appended claims.

In the description of the present disclosure, it is understood that the terms "first", "second", and so on, are used for descriptive purposes only and shall not be interpreted as indicating or implying relative importance. In the description of the present disclosure, it is to be noted that, unless otherwise expressly specified and limited, the terms "connected" and "coupled" are to be understood in a broad sense, such as, being fixedly, detachably or integrally connected; mechanically connected or electrically connected; directly connected or or indirectly connected through an intermediary. The specific meaning of the above terms in the context of the present disclosure can be understood in a specific context for any ordinary skilled person in the art. In addition, in the description of the present disclosure, unless otherwise stated, "a plurality of" means two or more; and "and/or" describes association of related objects and indicates that three relationships may exist. For example, A and/or B may indicate: presence of A alone, presence of both A and B, and presence of B alone. The character "/" generally indicates an "or" relationship between the associated objects before and after the character.

In embodiments of the present disclosure, following technical solutions are provided.

A method of displaying content of screen projection is applied to a method of receiving screen projection. The method includes the following. First content sent by an initiator that initiates screen projection is received. The first content is content provided by the initiator that initiates screen projection. In response to a receiver of the screen projection being displaying second content, the first content is displayed in a form of a window above the second content. In response to a first command, the first content is displayed in a first region. The first region is a region different from the region in which the window is located.

In some embodiments, the method further includes the following. A gesture is captured by a camera arranged in the receiver of the screen projection. The first command is generated in response to the gesture conforming to a predetermined gesture template. Alternatively, a voice is captured by a microphone arranged in the receiver of the screen projection. The first command is generated in response to the voice conforming to a predetermined voice template. Alternatively, the first command is generated in response to a predetermined operation for the window. Alternatively, a mode switching control is displayed in a third region. A corresponding first command is generated in response to the mode switching control being triggered. Different first commands correspond to different mode switching controls.

In some embodiments, when the first command is generated when the mode switching control is triggered, the mode switching control includes one of a display swapping control and a splitting-screen display control.

In some embodiments, the mode switching control includes the display swapping control. The operation of displaying the first content in the first region in response to the first command, includes: in response to the first command, controlling a region corresponding to displaying the first content to be swapped with a region corresponding to displaying the second content to allow the second content to be displayed in the form of the window above the first content.

In some embodiments, after the operation of controlling the region corresponding to displaying the first content to be swapped with the region corresponding to displaying the second content, the method further includes the following. A second command is generated in response to the mode switching control being triggered. The region corresponding to displaying the first content is controlled to be swapped with the region corresponding to displaying the second content in response to the second command, allowing first content to be restored to be displayed in the form of the window above the second content.

In some embodiments, the mode switching control includes the splitting-screen display control. The operation of displaying the first content in the first region in response to the first command, includes the following. The display screen is divided into a first region and a second region in response to the first command. The first region and the second region are rectangular. An area of the first region is greater than an area of the window and is smaller than an area of the second region. A ratio of a length of the first content to a width of the first content remains unchanged, and the first content is displayed in the first region. A ratio of a length of the second content to a width of the second content remains unchanged, and the second content is displayed in the second region.

In some embodiments, the method further includes the following. A screen projection cancelling control is displayed in a third region. A third command is generated in response to the screen projection cancelling control being triggered. Displaying the first content on the receiver of the screen projection is terminated in response to the third command.

In some embodiments, the operation of displaying the first content in the form of the window above the second content in response to the receiver of the screen projection being displaying the second content, includes the following. In response to the receiver of the screen projection being displaying the second content, a window displaying region is determined in a candidate region provided by the receiver of the screen projection, and the window displaying region is a region within the candidate region for displaying the window. In the window displaying region, the first content is displayed through the window above the second content.

In some embodiments, the operation of determining the window displaying region in the candidate region provided by the receiver of the screen projection, includes the following. An image still rate of the second content in a candidate sub-region is obtained. The candidate sub-region is a partial region within the candidate region. The image still rate is configured to indicate a ratio of a duration of an image being still to a statistical period. A target sub-region in the candidate region is determined. The target sub-region is a candidate sub-region, which is within the candidate region and has a highest image still rate. The window displaying region is determined in the target sub-region.

In some embodiments, the method further includes: determining audio content from the first content and the second content; and playing an audio corresponding to the audio content via a speaker of the receiver of the screen projection.

In some embodiments, the audio content is one of the first content and the second content having the largest area.

In some embodiments, the method further includes: determining a content corresponding to a focal window as the audio content. The content corresponding to the focal window is the first content or the second content.

In the present disclosure, the receiver of the screen projection receives the first content sent by the initiator of the screen projection. When the receiver of the screen projection is displaying the second content, the receiver of the screen projection displays the first content in the form of the window above the second content, such that the first content does not directly and fully cover the second content that is currently displayed. Subsequently, the receiver of the screen projection may display, in response to the first command, the first content in the first region, and the first region is a region different from the region in which the window is located. Therefore, when the receiver of the screen projection receives the content from the initiator of the screen projection, the receiver may display the content in a way that has least impact on the content that is currently being displayed, and the receiver of the screen projection may be controlled by a user of the receiver, such that the first content is displayed in the first region, reducing the extent that the content of screen projection interferes with content currently displayed, and optimizing an effect of displaying the content of screen projection.

In order to allow solutions in the embodiments of the present disclosure to be understood easily, various terms in the present disclosure will be described below.

In a first implementation, the first content is originally played in the initiator of screen projection. After the initiator of screen projection has successfully projected the first content to the receiver of screen projection to enable the first content to be displayed on the receiver of screen projection, the first content is still displayed in the initiator of screen projection. For example, when the first content is a game image, the game image may be displayed in the initiator of screen projection, and the game application may receive the user's instructions in the initiator of screen projection normally. In another example, when the first content is a user interface of a shopping application, the user may still display the user interface of the shopping application in the initiator of screen projection, enabling the user of the initiator of screen projection to further operate the shopping application and to view product information displayed in the shopping application.

In a second implementation, the first content is originally played in the initiator of screen projection. After the initiator of screen projection has successfully projected the first content to the receiver of screen projection to enable the first content to be displayed on the receiver of screen projection, the first content stops being displayed in the initiator of screen projection. In this implementation, the receiver of screen projection may continue to display a control interface about the first content. For example, when the first content is a video, the initiator of screen projection displays a control interface for the video, and the control interface may display controls for playing, stopping, fast forwarding, fast rewinding, adjusting a displaying timeline, or adjusting a volume.

In terms of a type of an application to which the first content belongs, the first content may be at least one of social applications, video applications, reading applications, map applications, weather applications, group buying applications, office applications, photographic applications, financial applications, travel applications, shopping applications, gaming applications or exam-learning applications.

The secondary content is the content that is being displayed on the receiver of screen projection. In an implementation, the second content is a live video stream provided by a network cloud or a TV station source. In another implementation, the second content is a video, and the video may be a local video in the receiver of screen projection. The video may be controlled by the receiver of screen projection by controls for playing, stopping, fast forwarding, fast rewinding, adjusting a displaying progress, or adjusting a volume.

Exemplarily, the method of displaying the content of the screen projection in the embodiments of the present disclosure can be applied in the receiver of screen projection. The receiver of screen projection is a device having a display screen. In some embodiments, a size of the display screen of the receiver of screen projection is physically large. For example, the receiver of screen projection may be a television, a projector, a personal computer, a wall-mounted display screen, a monitor of a video proctoring system, a tablet computer or a laptop computer, which will not be limited herein. In another implementation, any device having the display screen and configured with a remote control may serve as the receiver of screen projection in the present disclosure.

As shown in FIG. 1, FIG. 1 is a schematic view of a scenario of performing the method of displaying content of screen projection according to an embodiment of the present disclosure. In FIG. 1, a receiver of screen projection 111, a remote control device 112, and an initiator of screen projection 120 are included. The remote control device 112 is configured to remotely control the receiver of screen projection 111.

It should be noted that, FIG. 1 will be illustrated by taking the receiver of screen projection 111 as a TV, taking the remote control device 112 as a TV remote control, and taking the initiator of screen projection 120 as a mobile phone.

The receiver of screen projection 111 may be a TV arranged in the user's home, in an office, or in a public area. The receiver of screen projection 111 has a large sized display screen, and the display screen of the receiver of screen projection 111 may be split for displaying. In some embodiments, a size of the display screen of the receiver of screen projection 111 may be 10 inches or more.

The initiator of screen projection 120 may be connected to the receiver of screen projection 111 via Bluetooth, Wireless Fidelity (Wi-Fi) or other short-range wireless connection networks. Exemplarily, when the initiator of screen projection 120 and the receiver of screen projection 111 are connected in one Wi-Fi network, the initiator of screen projection 120 may project the first content to the receiver of screen projection 111.

Exemplarily, the initiator of screen projection 120 and the receiver of screen projection 111 may achieve screen projection in accordance with a screen projection protocol. The screen projection protocol may be any of AirPlay, Miracast, DLNA, Chromecast, WiDi, WDHI or a private projection protocol. It should be noted that the projection protocols herein are illustrative only and shall not limit the projection protocols in the present disclosure.

Based on the application scenario provided in FIG. 1, the initiator of screen projection may project a content that is currently displayed to the receiver of screen projection. The to-be-projected content will be displayed on the display screen of the receiver of screen projection by performing a process shown in FIG. 2, which will be described for more details in the following.

As shown in FIG. 2, FIG. 2 is a flow chart of the method of displaying content of screen projection according to an embodiment of the present disclosure. This method of displaying content of screen projection may be applied to the receiver of screen projection shown in FIG. 1. In order to facilitate introduction of the technical solution and understanding the reading, an example where the initiator of screen projection is a mobile phone and the receiver of screen projection is a TV will be illustrated. It should be noted that subjects of the method being the mobile phone and the TV are exemplary only, forms of other devices that may serve as the initiator of screen projection and the receiver of screen projection will not be limited herein. In FIG. 2, the method of displaying the content of the screen projection includes the following.

In an operation 210, the first content sent by the initiator of screen projection is received, and the first content is content provided by the initiator of screen projection.

In an embodiment of the present disclosure, the TV may receive the first content sent by the mobile phone, and the first content is content provided by the mobile phone. In an implementation, the first content is content displayed in the mobile phone.

In an implementation, the first content is a video played in the mobile phone, an image displayed in the mobile phone, or a live screen of a game displayed in the mobile phone.

In another implementation, the first content is a user interface of an application displayed in the mobile phone.

The user interface may be a desktop of an operating system, a negative one screen, a setting screen or a user interface of another operating system. The user interface may also be a user interface provided by a third party application.

It is noted that after the mobile phone has successfully projected the first content to the TV, the mobile phone may continually display the first content or stop displaying the first content; alternatively, the mobile phone may display the first content in a form of a small window. The present disclosure does not limit a way in which the first content is subsequently displayed in the mobile phone.

In an operation 220, in response to the receiver of screen projection being displaying the second content, the receiver of screen projection displays the first content in the form of the window above the second content.

In this example, the TV may display the first content sent from the mobile phone in a window in an upper layer above the second content while the TV is displaying the second content. The second content may be displayed in the TV in full screen, in half of the screen, or in a designated region of the screen.

The second content may alternatively be a user interface provided by an application of the TV. For example, the second content may be a desktop or a setting interface provided by an operating system of the TV. The second content may also be an application interface provided by a third party application installed in the TV. It is noted that the second content is content that contains information. In the present embodiment, the second content does not include a screen-off interface of the TV That is, the second content is content that contains information in the receiver of screen projection.

In the upper layer above the second content, the TV may predefine a region at a corner. The upper layer above the second content may be understood as a layer near a surface of the TV. When the first content is in the upper layer above the second content, the user may observe the first content in its entirety, and at the same time, the first content obscures a partial area of the second content.

For example, a top right corner of the TV is predefined as the region for displaying the window. When it is desired to display the first content in the form of the window, the TV may display the first content at the upper right corner in the window. In some embodiments, the TV may display the window in any of a bottom right, a top left or a bottom left corner. In an implementation, a location where the window is displayed may be determined by the user in setting options of the TV.

In an operation 230, in response to a first command, the first content is displayed in a first region, and the first region is different from the region in which the window is located.

In the present embodiment, the first command may be a command, which is received by the TV and is sent directly from the remote control, or may be a command generated in the TV based on input information.

In the first case, the TV takes the command sent directly from the remote control as the first command. The first command may be either a selection command generated when the user uses the remote control to select a control in the TV or generated when a function key in the remote control is being pressed. In some embodiments, in addition to the first command being the command generated when the function key in the remote control configured for the TV is being pressed, the first command may alternatively be a command generated when a virtual button in a virtual remote control displayed in the mobile phone is being pressed.

It should be noted that when the first command is the selection command generated when the user takes the remote control to select the control in the TV, the user uses the remote control to move a cursor to reach the window and then double-clicks or single-clicks a submission button to trigger the mobile phone to generate the first command. In this scenario, the TV generates the first command in response to a predetermined operation for the window. In some embodiments, in addition to the above-mentioned single-click and double-click, the predetermined operation may alternatively be a touch operation, such as a long-term pressing operation, a dragging operation, or a scratching operation, which will not be limited herein.

In a second embodiment, the TV may obtain input information via an input component, and generate the first command based on the input information. The input component may be a camera or a microphone. In some embodiments, the input information may be an image containing a gesture or a body gesture, and the image may be one or more images. In some embodiments, the input information may alternatively be a small video. The television receives the small video, extracts image feature information from the video, finds a matching command based on the image feature information, and takes the matching command as the first command. In some embodiments, the input information may be a voice spoken by the user. When the TV collects the voice, the TV extracts sound features from the voice, finds a matching command based on the sound features, and takes the matching command as the first command. While the first command is being generated, the TV may capture the gesture through the camera arranged in the TV and generate the first command in response to the gesture matching a predefined gesture template. Alternatively, the TV may collect the voice via the microphone arranged in the TV and generate the first command in response to the voice matching a predetermined voice template.

In this example, the TV may display the first content in the first region in response to the first command. The first region is different from the region where the window is located. In other words, the region in which the first content is displayed changes in response to the first command. Therefore, in the present embodiment, while the TV is displaying the second content, the TV may firstly display the projected first content in the form of the window and then change the region of displaying the first content in response to the first command which reflects the user's demands.

Figure 3:
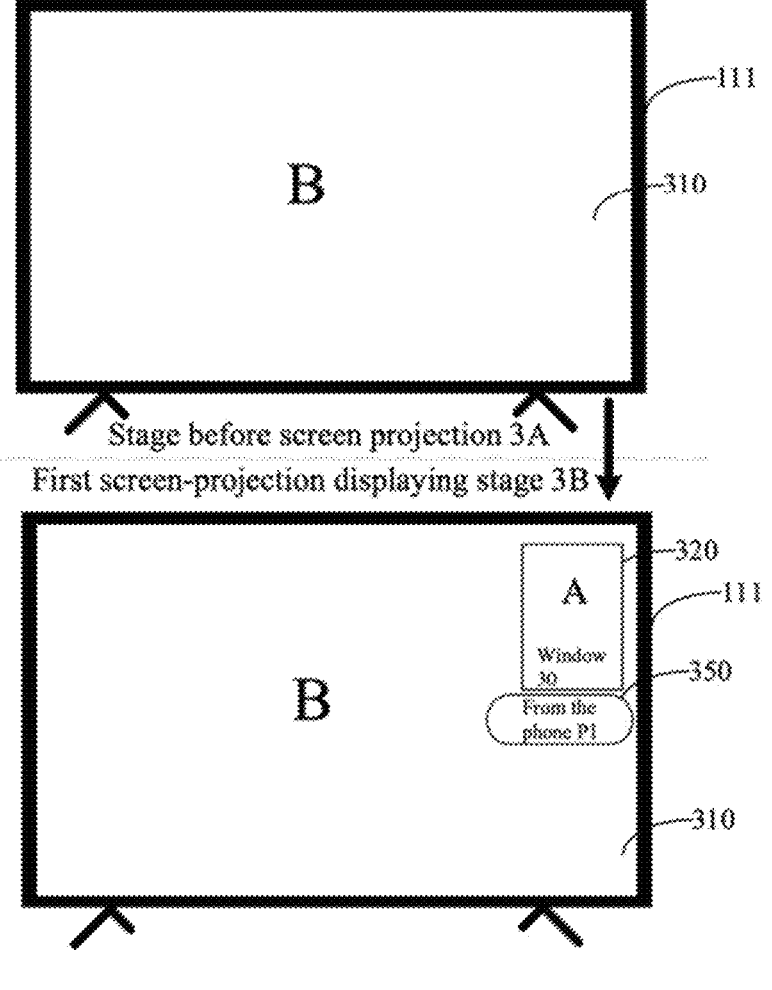
FIG. 3 is a schematic view of content shown on a receiver of the method of displaying content of the screen projection according to the embodiment of FIG. 2.

Variation in the displaying of the TV will be illustrated below by a schematic diagram, as shown in FIG. 3, FIG. 3 is a schematic view of content shown on a receiver of the method of displaying content of screen projection according to the embodiment of FIG. 2. In an unprojected stage 3A of FIG. 3, the receiver of screen projection 111 is taking the full screen to display the second content 310. When the receiver of screen projection 111 receives the first content 320 sent by the initiator of screen projection 120, the receiver of screen projection 111 enters a first screen-projection displaying stage 3B. In the first screen-projection displaying stage 3B, the receiver of screen projection 111 continues to take the full screen to display the second content 310 and takes a window, which is located at the upper layer above the second content 310, to display the first content 320. The receiver of screen projection 111 changes a manner of displaying of first content 320 in response to the first command, and displays the first content 320 in the first region. The first region is different from the region where the window is located.

In some embodiments, the TV may further display a name of the initiator of screen projection below the window 30. For example, in FIG. 3, an identifier 350 of "phone P1" is shown.

In summary, in the present embodiment, the receiver of screen projection receives the first content sent by the initiator of screen projection. While the receiver of screen projection is displaying the second content, the receiver of screen projection displays the first content in the form of the window above the second content, such that the first content does not directly and fully cover the second content that is currently being displayed. Subsequently, the receiver of screen projection may display the first content in the first region in response to the first command, and the first region is different from the region where the window is located. Therefore, when the receiver of the screen projection receives the content from the initiator of the screen projection, the receiver may display the content in a way that has least impact on the content that is currently being displayed on the receiver. In this way, after the initiator of screen projection initiates the screen projection, the receiver of the screen projection may be controlled by the user of the receiver, such that the first content is displayed in the first region, reducing the extent that the content of screen projection interferes with content currently displayed, and optimizing an effect of displaying the content of screen projection.

Based on the technical solution described in the above, the manner that the receiver of screen projection displays the first content in the form of the window may be changed, based on different first commands, into another manner, which will be illustrated in the following embodiments.

As shown in FIG. 4, FIG. 4 is a flow chart of the method of displaying content of screen projection according to another embodiment of the present disclosure. The method of displaying the content of screen projection may be applied to the receiver of screen projection as shown above. In FIG. 4, the method of displaying the content of screen projection includes the following.

In an operation 410, the first content sent by the initiator of screen projection is received.

In the present embodiment, a process of performing the operation 410 is the same as that of performing the operation 210, and will not be repeated here.

In an operation 421, in response to the receiver of screen projection being displaying the second content, the window displaying region is determined in a candidate region provided by the receiver of screen projection.

The window displaying region is a region within the candidate region for displaying the window.

In some embodiments, the TV may determine a sub-region, which has a relatively high image still rate, from the candidate region as a target sub-region and determines the window displaying region within the target sub-region. In detail, the TV may achieve the effect of determining the window displaying region by performing the operations (a1), (a2), and (a3).

In the operation (a1), an image still rate of the second content in the candidate sub-region is determined. The candidate sub-region is a sub-region within the candidate region. The image still rate is configured to indicate a ratio of a duration that the image is still to a statistical period.

In the present embodiment, the TV may divide the display screen into a plurality of candidate regions. For example, the TV may determine an upper left corner of the display screen, an upper right corner of the display screen, a lower left corner of the display screen, and a lower right corner of the display screen as 4 candidate sub-regions. The 4 candidate sub-regions serves as the candidate regions of the TV. The TV may obtain the image still rate of each candidate sub-region. For example, a statistical period is 30 seconds, and the duration that the image is still is 24 seconds, and therefore, the image still rate is equal to 0.8.

In the operation (a2), a target sub-region is determined from the candidate regions. The target sub-region is a candidate sub-region having a highest image still rate among all candidate regions.

In the present embodiment, the TV has a plurality of candidate sub-regions. The TV may obtain the image still rate of each candidate sub-region through statistics, and determine one candidate sub-region having the highest image still rate from the plurality of candidate sub-regions, as the target sub-region.

In an operation (a3), the window displaying region is determined within the target sub-region.

In an implementation, the TV directly determines the target sub-region as the window displaying region.

In another implementation, the TV determines a partial region within the target sub-region as the window displaying region.

Figure 5:
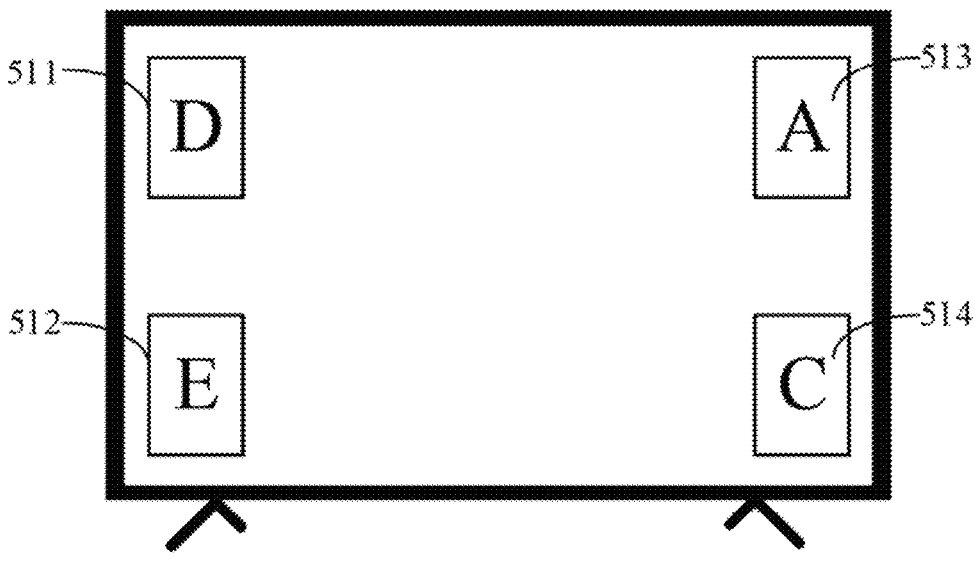
FIG. 5 is a schematic view of window displaying region according to the embodiment of FIG. 4.

As shown in FIG. 5, FIG. 5 is a schematic view of window displaying region according to the embodiment of FIG. 4. In FIG. 5, the TV presets four candidate sub-regions: an upper left region 511, a lower left region 512, an upper right region 513, and a lower right region 514. The above four candidate sub-regions form the candidate regions. The TV determines the target sub-region from the candidate regions. For example, the TV determines the upper right region 513 as the target sub-region.

The process of determining the target sub-region may be performed based on the image still rate. The TV takes 30 seconds as one statistical period, and respectively obtains the image still rate of each candidate sub-region. When the image of the candidate sub-region does not change in one second, the duration that the image of the candidate sub-region is still is increased by one second. When image still of the candidate sub-region is counted for 30 seconds, the image still rate of the candidate sub-region is obtained. For example, when the duration of the image of the candidate sub-region is still is 24 seconds, a corresponding image still rate is equal to 24/30, which is 0.8.

As shown in Table 1, Table 1 shows statistical values of possible image still rates.

TABLE 1

| | Upper left region | lower left region | Upper right region | Lower right region |
|---|---|---|---|---|
| Statistical period | 30 seconds | 30 seconds | 30 seconds | 30 seconds |
| Duration that the image is still | 6 seconds | 18 seconds | 24 seconds | 12 seconds |
| Image still rate | 0.2 | 0.6 | 0.8 | 0.4 |

In Table 1, the TV obtains the image still rate of each of the four candidate sub-regions through statistics. Since the image still rate of the upper right region is the highest, the upper right region is determined as the target sub-region. Finally, within the upper right region, the window displaying region for displaying the first content is determined based on a horizontal screen state or a vertical screen state of the first content.

For example, after the upper right region is determined as the target sub-region, the TV may determine the window displaying region within the upper right region based on a displaying ratio of the first content. For example, the TV determines a point A in the upper right region as an upper right corner of the window displaying region, and displays the first content based on a specified coefficient K. If an original size of the first content is 300*500 and the coefficient K is 1.5, the window displaying region may be 450*750.

In an operation 422, in the window displaying region, the first content is displayed through the window on the upper layer above the second content.

In some embodiments, the window displaying region may be set as a window displaying control by an operating system of the TV, such that the second content is displayed in the window displaying control.

In an operation 431, the mode switching control is displayed in a third region.

The mode switching control includes one of a display swapping control and a splitting-screen display control.

It should be noted that the TV may further display the mode switching control in the third region. The mode switching control may be a control, such as a button or a slide block.

In an implementation, the third region may be displayed at a location adjacent and attached to the window that displays the first content. For example, the third region may be adjacent and attached to a bottom edge or a side edge of the window.

In an operation 432, in response to the mode switching control being triggered, a corresponding first command is generated. Different mode switching controls correspond to different first commands.

For example, the mode switching control in the present embodiment includes the display swapping control and the splitting-screen display control. The first command corresponding to the display swapping control is different from the first command corresponding to the splitting-screen display control.

In an operation 433, in response to the first command, the first content is displayed in the first region.

In the present embodiment, the TV may determine different first regions according to different mode switching controls, such that different displaying effects may be achieved for the first content, which serves as the content of screen projection In an implementation, when the mode switching control includes the display swapping control, the TV may perform an operation (b) to achieve the effect of displaying the first content in the first region.

In the operation (b), in response to the first command, the displaying region for displaying the first content is controlled to be swapped with the displaying region for displaying the second content, such that the second content is displayed in the form of the window on the upper layer above the first content.

In the present embodiment, the TV may allow the first content to interact with the second content about their respective displaying regions, in response to the first command. For example, originally the second content is displayed in full screen in the TV while the first content is displayed in the window in the TV. In this scenario, the TV displays the first content in the full screen and displays the second content in the window in response to the first command.

After the TV performs the operation (b), the first content is displayed in the full screen, and the second content is displayed in the window. When the user desires to restore displaying the second content in the full screen and displaying the first content in the form of the window, the TV may perform the operations (c1) and (c2).

In the operation (c1), in response to the mode switching control being triggered, a second command is generated.

In the present embodiment, the TV generates the second command when the mode switching control is triggered again by the user.

In the operation (c2), in response to the second command, the displaying region for displaying the first content is controlled to be swapped with the displaying region for displaying the second content, such that the first content is restored to be displayed in the window on the upper layer above the second content.

In the present embodiment, the TV controls, in response to the second command, the first content to interact with the second content to swap their respective displaying regions. Since the first content and the second content have already swapped their respective displaying regions once, the TV may restore, in response to the second command, to display the first content in the window on the upper layer above the second content.

Figure 6:
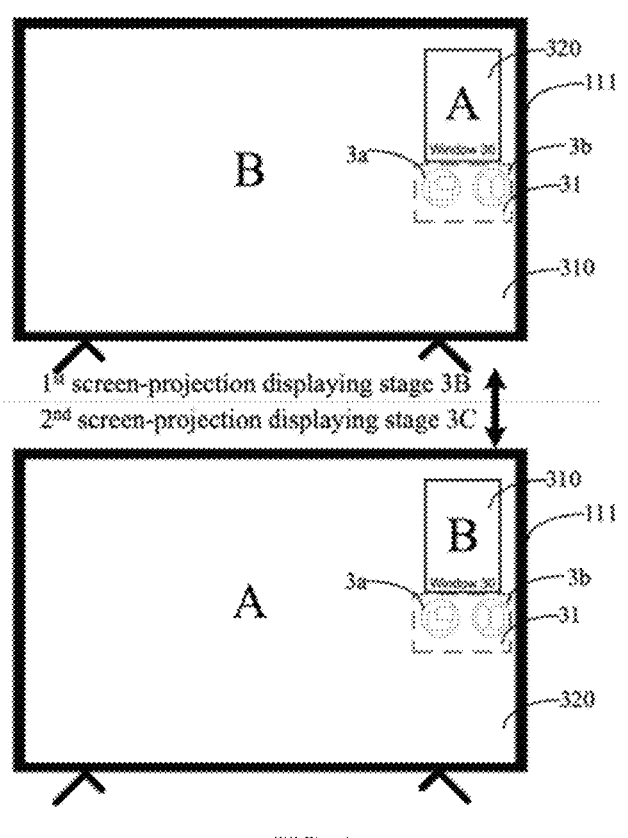
FIG. 6 is a schematic view of a process of switching to display first content according to the embodiment of FIG. 4.

As shown in FIG. 6, FIG. 6 is a schematic view of a process of switching to display first content according to the embodiment of FIG. 4. In FIG. 6, the receiver of screen projection 111 displays the second content 310 in the full screen in the first screen-projection displaying stage 3B and displays the first content 320 in the window 30 located above the second content 310. At the same time, the receiver of screen projection 111 displays the mode switching control 3a and the splitting-screen display control 3b in the third region 31 next to the window 30.

It should be noted that the mode switching control 3a and the splitting-screen display control 3b may be hidden from being viewed. When the window 30 is in a selected state in which the window 30 is selected by the cursor, or when the window 30 is clicked, the receiver of screen projection 111 may display the mode switching control 3a and the splitting-screen display control 3b. If neither the mode switching control 3a nor the splitting-screen display control 3b is triggered within a predetermined period of time, the receiver of screen projection 111 may hide the mode switching control 3a and the splitting-screen display control 3b again.

In response to generating the first command when the mode switching control 3a is triggered, the receiver of screen projection enters a second screen-projection displaying stage 3C from the first screen-projection displaying stage 3B. In the second screen-projection displaying stage 3C, the TV displays the first content 320 in the full screen and displays the second content 310 in the window 30 above the first content 320.

In response to generating the second command when the mode switching control 3a is triggered again, the receiver of screen projection is restored to the first screen-projection displaying stage 3B from the second screen-projection displaying stage 3C.

In another implementation, when the mode switching control includes the splitting-screen display control, the TV may achieve the effect of displaying the first content in the first region by performing the operations (d1), (d2), and (d3).

In the operation (d1), in response to the first command, the display is divided into a first region and a second region. The first region and the second region are both rectangular. An area of the first region is larger than an area of the window and is smaller than an area of the second region.

In the operation (d2), a ratio of a length of the first content to a width of the first content remains unchanged, and the first content is displayed in the first region.

In the operation (d3), a ratio of a length of the second content to a width of the second content remains unchanged, and the second content is displayed in the second region.

Figures 7, 8:
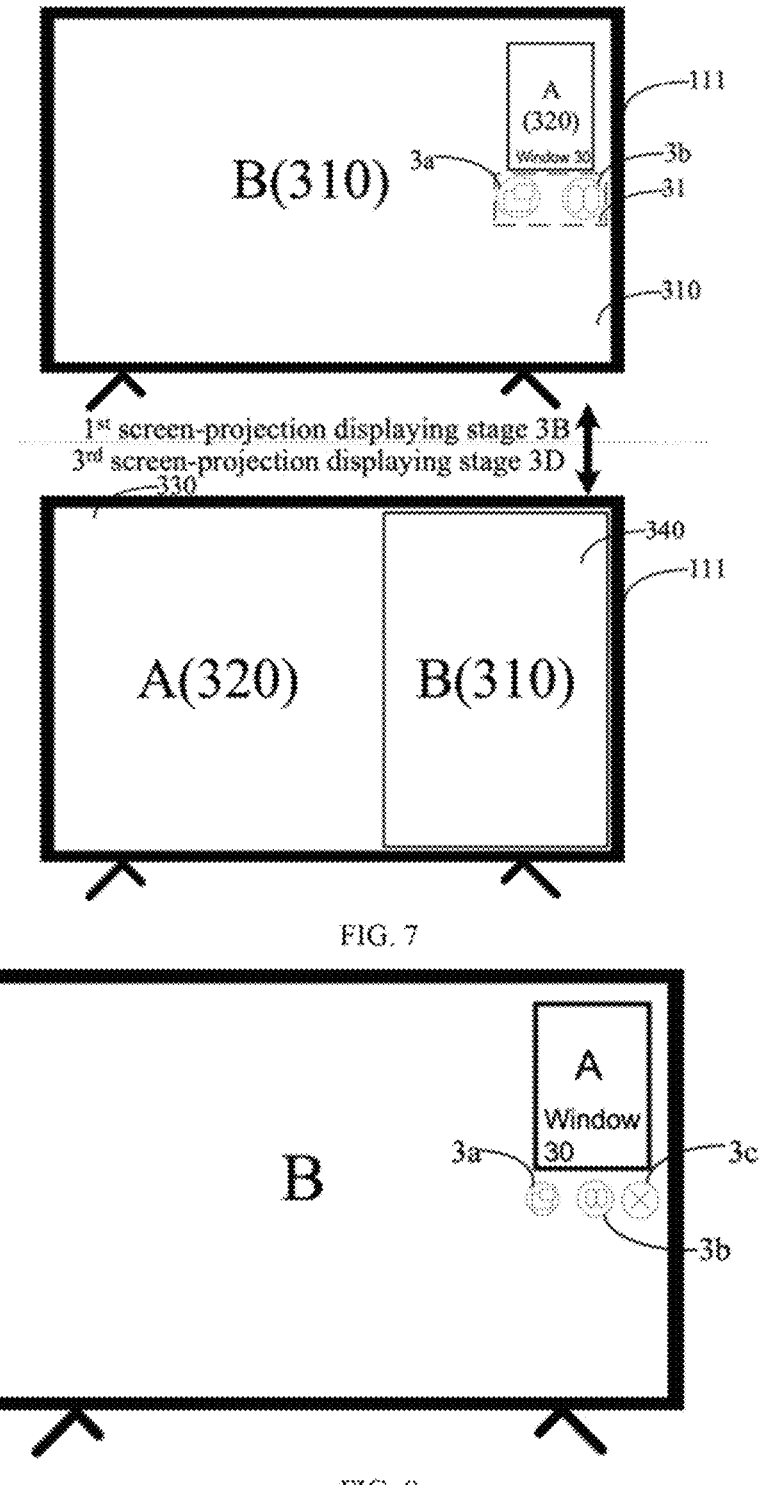
FIG. 7 is a schematic view of another process of switching to display first content according to the embodiment of FIG. 4.
FIG. 8 is schematic view of a control for cancelling screen projection according to the embodiment of FIG. 4.

As shown in FIG. 7, FIG. 7 is a schematic view of another process of switching to display first content according to the embodiment of FIG. 4. In FIG. 7, the receiver of screen projection 111 displays the second content 310 in full screen in the first screen-projection displaying stage 3B and displays the first content 320 in the window 30 located above the second content 310. At the same time, the receiver of screen projection 111 displays the mode switching control 3a and the splitting-screen display control 3b in the third region 31 adjacent to the window 30.

In response to the first command being generated when the splitting-screen display control 3b is triggered, the receiver of screen projection enters the third screen-projection displaying stage 3D from the first screen-projection displaying stage 3B. In the third screen-projection displaying stage 3D, the TV displays the first content 320 in the first region 330 and displays the second content 310 in the second region 340.

In an operation 441, the screen projection cancelling control is displayed in the third region.

In the present embodiment, the TV may display the screen projection cancelling control in the third region. The screen projection cancelling control may be a button. The screen projection cancelling control, the display swapping control, and the splitting-screen display control may be displayed on a same row.

In the operation 442, a third command is generated in response to the screen projection cancelling control being triggered.

In the present embodiment, the TV may generate the third command after the screen projection cancelling control is triggered.

In the operation 443, in response to the third command, displaying the first content in the receiver of screen projection is terminated.

In the present embodiment, the TV may stop displaying the first content in response to the third command. In an implementation, terminating displaying the first content may be achieved by closing the window in the receiver of screen projection.

As shown in FIG. 8, FIG. 8 is schematic view of a control for cancelling screen projection according to the embodiment of FIG. 4. In FIG. 8, the screen projection cancelling control 3c is displayed along with the display swapping control 3a and the splitting-screen display control 3b.

In an operation 451, the audio content is determined from the first content and the second content.

In some embodiments, the audio content is one of the first content and the second content having the largest area.

In the present embodiment, when both the first content and the second content are displayed in the display screen, the speaker of the TV may determine an audio, which corresponds to one of the first content and the second content, as the audio content. In this way, both video and audio of the audio content can be played by the TV. In an implementation, the TV determines the content, which is one of the first content and the second content and has the largest area, as the audio content. When the audio content changes, the audio played from the speaker may be changed accordingly.

In some embodiments, the TV may determine content corresponding to a focal window as the audio content. The content corresponding to the focal window is the first content or the second content.

In the present embodiment, the content on which the cursor currently rests may be determined in the operating system of the TV as the content corresponding to the focal window.

In the operation 452, the audio corresponding to the audio content is played through the speaker of the receiver of screen projection.

To be noted that, after the receiver of screen projection determines the audio content, the speaker of the receiver of screen projection may play the audio corresponding to the audio content.

Based on the above, after the TV determines the audio content, the other content is non-audio content. The TV may send an audio of the non-audio content to the initiator of screen projection. The non-audio content is played through a headphone of the initiator of screen projection. Therefore, in this way, the audio of each content in the TV has a corresponding playing channel.

In summary, in the present embodiment, the mode switching control is displayed in the third displaying region. The first command is generated when the mode switching control is triggered. The first content is displayed in the corresponding first region based on different first commands. The content of screen projection minimally interferes with content that is currently displayed, and the receiver of screen projection has increased control over the displaying region for displaying the content of screen projection.

In some embodiments, in the present disclosure, when the mode switching control is the display swapping control, and when the display swapping control is triggered, the displaying region for displaying the first content is swapped with the displaying region for displaying the second content, such that the displaying region for displaying the first content may be expanded quickly when the first content requires a larger displaying region.

In some embodiments, in the present disclosure, when the mode switching control is the splitting-screen display control, and when the splitting-screen display control is triggered, the first region and the second region are determined. The first content, whose ratio of a length to a width is unchanged, may be displayed in different displaying regions, and the second content, whose ratio of a length to a width is unchanged, may be displayed in different displaying regions. The ability of simultaneously displaying the content of screen projection and displaying the content that is originally displayed is improved.

In some embodiments, the TV in the present disclosure may further display the screen projection cancelling control. When the screen projection cancelling control is triggered, the third command is generated. In response to the third command, the TV stops displaying the first content, allowing the TV side to exit the screen projection quickly.

In some embodiments, the TV in the present disclosure may further determine the region for displaying the window based on the image still rate. The TV may determine the region having the higher image still rate as the region for displaying the window, and display the first content in the determined region.

In some embodiments, the TV in the present disclosure may further determine the audio content from the first content and the second content and play the audio corresponding to the audio content through the speaker. Therefore, the TV is highly likely to play the audio of the content that the user wishes to watch.

The following is an embodiment of an apparatus of the present disclosure configured to perform the method embodiment of the present disclosure. Details that are not disclosed in the apparatus embodiment of the present disclosure may be referred to the method embodiment of the present disclosure.

Figure 9:
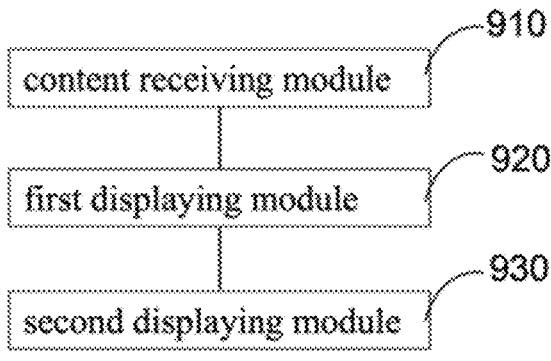
FIG. 9 is a structural schematic view of an apparatus of displaying content of screen projection according to an embodiment of the present disclosure.

As shown in FIG. 9, FIG. 9 is a structural schematic view of an apparatus of displaying content of screen projection according to an embodiment of the present disclosure. The displaying apparatus for displaying the content of screen projection can be implemented as all or part of the receiver of screen projection through software, hardware, or a combination of both. The apparatus may include the following.

A content receiving module 910 is configured to receive the first content sent by the initiator of screen projection, and the first content is content provided by the initiator of screen projection.

A first displaying module 920 is configured to display the first content in the form of the window above the second content in response to the receiver of screen projection being displaying the second content.

A second displaying module 930 is configured to display the first content in the first region in response to the first command, and the first region is different from the region in which the window is located.

In an embodiment, the apparatus includes at least one of: a first generation module, a second generation module, a third generation module, and a fourth generation module. The first generation module is configured to take a camera arranged in the receiver of the screen projection to capture a gesture and to generate the first command in response to the gesture conforming to a predetermined gesture template. The second generation module is configured to take the microphone arranged in the receiver of the screen projection to collect the voice and to generate the first command in response to the voice conforming to a predetermined voice template. The third generation module is configured to generate the first command in response to a predetermined operation performed for the window. The fourth generation module is configured to display the mode switching control in the third region and to generate the corresponding first command in response to the mode switching control being triggered. Different first commands correspond to different mode switching controls.

In an embodiment, when the first command is generated when the mode switching control is triggered, the mode switching control relating to the apparatus includes one of the display swapping control and the splitting-screen display control.

In an embodiment, the mode switching control relating to the apparatus includes the display swapping control. The second displaying module 930 is configured to control, in response to the first command, the region corresponding to displaying the first content to be swapped with the region corresponding to displaying the second content to allow the second content to be displayed in the form of the window above the first content.

In an embodiment, the apparatus further includes a restoring module, configured to: generate the second command in response to the mode switching control being triggered, after controlling the region corresponding to displaying the first content to be swapped with the region corresponding to displaying the second content; and control the region corresponding to displaying the first content to be swapped with the region corresponding to displaying the second content in response to the second command to allow first content to be restored to be displayed in the form of the window above the second content.

In an embodiment, the mode switching control relating the apparatus includes the splitting-screen display control, and the second displaying module 930 is configured to: divide, in response to the first command, the display screen into the first region and the second region; remain a ratio of a length of the first content to a width of the first content unchanged, display the first content in the first region; and remain a ratio of a length of the second content to a width of the second content unchanged, and display the second content in the second region. The first region and the second region are rectangular. An area of the first region is greater than an area of the window and is smaller than an area of the second region.

In an embodiment, the apparatus further includes a screen projection cancelling control. The screen projection cancelling control is configured to: be displayed in the third region; generate a third command in response to the screen projection cancelling control being triggered; and terminate displaying the first content on the receiver of the screen projection in response to the third command.

In an embodiment, the first displaying module 920 is configured to: determine a window displaying region in a candidate region provided by the receiver of the screen projection in response to the receiver of the screen projection being displaying the second content; and display the first content in the window displaying region and through the window above the second content. The window displaying region is a region within the candidate region for displaying the window.

In an embodiment, the first displaying module 920 is configured to: obtain an image still rate of the second content in a candidate sub-region; determine a target sub-region in the candidate region; and determine the window displaying region in the target sub-region. The candidate sub-region is a partial region within the candidate region. The image still rate is configured to indicate a ratio of a duration of an image being still to a statistical period. The target sub-region is a candidate sub-region, which is within the candidate region and has a highest image still rate.

In an embodiment, the apparatus further includes an audio determination module, configured to: determine audio content from the first content and the second content; and play an audio corresponding to the audio content via a speaker of the receiver of the screen projection.

In an embodiment, the audio content relating to the apparatus is one of the first content and the second content having the largest area.

In an embodiment, the audio determination module is further configured to: determine a content corresponding to a focal window as the audio content. The content corresponding to the focal window is the first content or the second content.

In summary, the apparatus in the present disclosure displays the mode switching control in the third display region; generates the first command when the mode switching control is triggered; and displays the first content in the corresponding first region based on different first commands. The content of screen projection minimally interferes with content that is currently displayed, and the receiver of screen projection has increased control over the displaying region for displaying the content of screen projection.

In an embodiment, in the present disclosure, when the mode switching control is the display swapping control, and when the display swapping control is triggered, the displaying region for displaying the first content is swapped with the displaying region for displaying the second content, such that the displaying region for displaying the first content may be expanded quickly when the first content requires a larger displaying region.

In an embodiment, in the present disclosure, when the mode switching control is the splitting-screen display control, and when the splitting-screen display control is triggered, the first region and the second region are determined. The first content, whose ratio of a length to a width is unchanged, may be displayed in different displaying regions, and the second content, whose ratio of a length to a width is unchanged, may be displayed in different displaying regions. The ability of simultaneously displaying the content of screen projection and displaying the content that is originally displayed is improved.

In an embodiment, the TV in the present disclosure may further display the screen projection cancelling control. When the screen projection cancelling control is triggered, the third command is generated. In response to the third command, the TV stops displaying the first content, allowing the TV side to exit the screen projection quickly.

In an embodiment, the TV in the present disclosure may further determine the region for displaying the window based on the image still rate. The TV may determine the region having the higher image still rate as the region for displaying the window, and display the first content in the determined region.

In an embodiment, the TV in the present disclosure may further determine the audio content from the first content and the second content and play the audio corresponding to the audio content through the speaker. Therefore, the TV is highly likely to play the audio of the content that the user wishes to watch.

Figure 10:
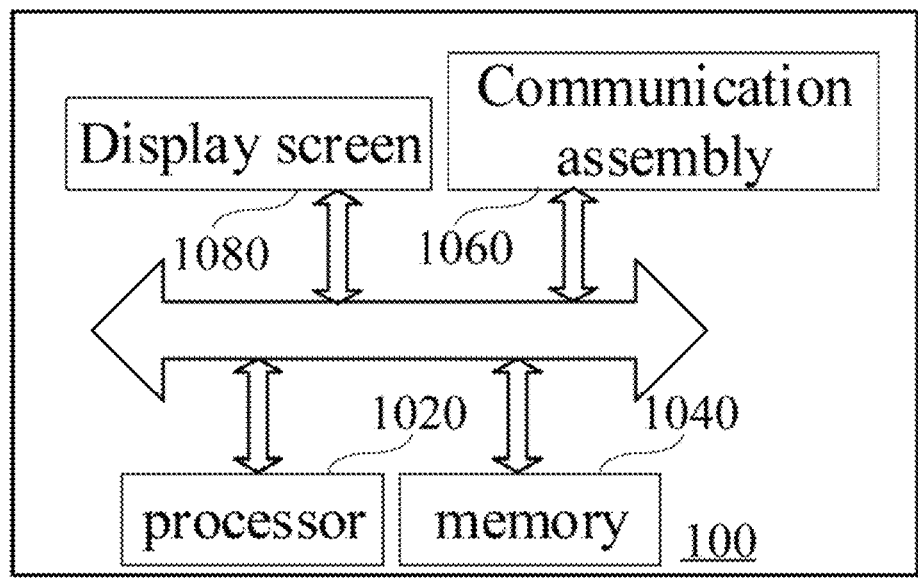
FIG. 10 is a structural schematic view of a device having a display screen according to an embodiment of the present disclosure.

As shown in FIG. 10, FIG. 10 is a structural schematic view of a device having a display screen according to an embodiment of the present disclosure. As shown in FIG. 10, the device having the display screen includes a processor 1020, a memory 1040, a communication assembly 1060, and a display screen 1080. The memory 1040 stores at least one instruction. The instruction is loaded and executed by the processor 1020 to perform the method of displaying the content of screen projection as described in various method embodiments of the present disclosure.

In the present disclosure, the receiver of screen projection 1000 is an electronic device having a displaying function. The processor 1020 may include one or more processing cores. The processor 1020 takes various interfaces and lines to connect various parts within the entire receiver of screen projection 1000 and performs various functions and processes data of the receiver of screen projection 1000 by running or executing instructions, programs, code sets, or instruction sets stored in the memory 1040, and by invoking data stored in the memory 1040. In some embodiments, the processor 1020 may be implemented as at least one of: a digital signal processing (DSP), a field-programmable gate array (FPGA), a programmable logic array (PLA). The processor 1020 may integrate one or a combination of a central processing unit (CPU), a graphics processing unit (GPU), and a modem. The CPU mainly processes the operating system, user interfaces, applications, and so on. The GPU is configured to render and draw the content to be displayed on the display screen. The modem is configured to process wireless communication. It may be understood that the above modem may alternatively be implemented through one chip without being integrated into the processor 1020.

The memory 1040 may include a random access memory (RAM) and a read-only memory (ROM). In some embodiments, the memory 1040 includes a non-transitory computer-readable storage medium. The memory 1040 may be configured to store instructions, programs, codes, code sets, or instruction sets. The memory 1040 may include a program storage area and a data storage area. The program storage area may store instructions for implementing an operating system, instructions for achieving at least one function (such as a touch function, a sound playing function, an image displaying function, and so on), instructions for implementing each of the method embodiments described below. The data storage area may store data involved in each of the method embodiments described below.

The communication assembly 1060 is configured to establish communication connections with other devices through a specified communication protocol. The communication connections include Wi-Fi connection, Bluetooth connection, ZigBee connection, and other communication protocols. The present disclosure does not limit communication protocols. The communication assembly 1060 of the receiver of screen projection 1000 may be configured to establish communication connections with a plurality of devices at the same time.

The display screen 1080 is configured to display an image that is rendered by the processor. In some embodiments, when the device having the display screen is a device having a large sized screen, such as a TV, the display screen 1080 may be a large sized TV screen. The TV screen may be in a size of 30 inches, 32 inches, 34 inches, 40 inches, 42 inches, 48 inches, 55 inches, 60 inches, 65 inches, 100 inches, and so on. In other implementations, when the device having the display screen is a device having a computer monitor, the display screen 1080 may be implemented into a size of 18 inches, 20 inches, 22 inches, 24 inches, 32 inches, and so on.

Embodiments of the present disclosure further provide a computer readable medium having at least one instruction stored thereon. The at least one instruction is loaded and executed by the processor to implement the method of displaying the content of screen projection as described in various embodiments above.

It should be noted that when the apparatus for displaying content of screen projection provided in the above-mentioned embodiments are performing the method of displaying the content of screen projection, division of the above-mentioned functional modules are illustrated as examples only. In practice, the above-mentioned functions may be assigned by different functional modules based on the needs, that is, the internal structure of the device is divided into different functional modules to complete all or part of the above described functions. In addition, the above-mentioned embodiment provides the apparatus of displaying the content of screen projection and the method of displaying the content of screen projection belong to a same concept. Specific implementation processes are detailed in the method embodiments, and will not be repeated here.

The above mentioned embodiments of the present disclosure are numbered for descriptive purposes only, and the numbers do not represent merits of the embodiments.

Any ordinary skilled person in the art shall understand that all or some of the operations of the above embodiments may be accomplished by hardware, or a program may instruct the relevant hardware to perform the operations. The program may be stored in a computer readable storage medium, and the above-mentioned storage medium may be a read-only memory, a magnetic disk or an optical disk, and so on.

The above shows only an exemplary embodiment of the present disclosure but does not limit the present disclosure. Any modification, equivalent replacement, improvement, and so on, made within the spirit and principles of the present disclosure shall be included in the scope of the present disclosure.

What is claimed is:

1. A method of displaying content of screen projection, performed by a receiver of screen projection, the method comprising:

receiving first content sent by an initiator of screen projection, wherein the first content is content provided by the initiator of screen projection;

displaying the first content in a form of a window above second content in response to the receiver of screen projection being displaying the second content; wherein, the second content is content that is being displayed on the receiver of screen projector before the receiver of screen projector receives the first content; the second content is content that contains information and does not include a screen-off interface; when the first content is being displayed in the window on the receiver of screen projection, the window covers at least part of the second content; and displaying the first content in a first region in response to a first command, wherein the first region is different from a region in which the window is located.

2. The method according to claim 1, further comprising:

taking a camera arranged in the receiver of the screen projection to capture a gesture, generating the first command in response to the gesture conforming to a predetermined gesture template;

or taking a microphone arranged in the receiver of the screen projection to collect a voice, generating the first command in response to the voice conforming to a predetermined voice template;

or generating the first command in response to a predetermined operation performed for the window;

or displaying a mode switching control in a third region, generating the first command correspondingly in response to the mode switching control being triggered, wherein different mode switching controls correspond to different first commands.

3. The method according to claim 2, wherein when the first command is generated when the mode switching control is triggered, the mode switching control comprises one of a display swapping control and a splitting-screen display control.

4. The method according to claim 3, wherein the mode switching control comprises the display swapping control, and the displaying the first content in a first region in response to a first command, comprises:

controlling, in response to the first command, a region corresponding to displaying the first content to be swapped with a region corresponding to displaying the second content to allow the second content to be displayed in the form of the window above the first content.

5. The method according to claim 4, wherein after the controlling a region corresponding to displaying the first content to be swapped with a region corresponding to displaying the second content, the method further comprises:

generating a second command in response to the mode switching control being triggered; and controlling the region corresponding to displaying the first content to be swapped with the region corresponding to displaying the second content in response to the second command to allow first content to be restored to be displayed in the form of the window above the second content.

6. The method according to claim 3, wherein the mode switching control comprises the splitting-screen display control, and the displaying the first content in a first region in response to a first command, comprises:

dividing, in response to the first command, a display screen of the receiver into the first region and a second region, wherein the first region and the second region are rectangular, and an area of the first region is greater than an area of the window and is smaller than an area of the second region;

remaining a ratio of a length of the first content to a width of the first content unchanged, displaying the first content in the first region; and remaining a ratio of a length of the second content to a width of the second content unchanged, and displaying the second content in the second region.

7. The method according to claim 1, further comprising:

displaying a screen projection cancelling control in a third region;

generating a third command in response to the screen projection cancelling control being triggered; and terminating displaying the first content on the receiver of screen projection in response to the third command.

8. The method according to claim 1, wherein the displaying the first content in a form of a window above second content in response to the receiver of screen projection being displaying the second content, comprises:

determining a window displaying region from a candidate region provided by the receiver of screen projection in response to the receiver of screen projection being displaying the second content, wherein the window displaying region is a region within the candidate region and is configured to display the window; and displaying the first content in the window displaying region and through the window above the second content.

9. The method according to claim 8, wherein the determining a window displaying region from a candidate region provided by the receiver of screen projection, comprises:

obtaining an image still rate of the second content in a candidate sub-region, wherein the candidate sub-region is a partial region within the candidate region, the image still rate is configured to indicate a ratio of a duration of an image being still to a statistical period;

determining a target sub-region in the candidate region, wherein the target sub-region is a candidate sub-region, which is within the candidate region and has a highest image still rate; and determining the window displaying region in the target sub-region.

10. The method according to claim 1, further comprising:

determining audio content from the first content and the second content; and playing an audio corresponding to the audio content via a speaker of the receiver of screen projection.

11. The method according to claim 10, wherein the audio content is one of the first content and the second content and has a largest area.

12. The method according to claim 10, further comprising:

determining content corresponding to a focal window as the audio content, wherein the content corresponding to the focal window is the first content or the second content.

13. The method according to claim 10, wherein content other than the determined audio content is non-audio content, and the method further comprises: sending an audio of the non-audio content to the initiator of screen projection; and playing the audio of the non-audio content through a headphone of the initiator of screen projection.

14. A terminal, comprising a processor, a memory connected to the processor, and program instructions stored on the memory, wherein the processor is configured to perform, when executing the program instructions, operations of:

receiving first content sent by an initiator of screen projection, wherein the first content is content provided by the initiator of screen projection;

displaying the first content in a form of a window above second content in response to the receiver of screen projection being displaying the second content; and displaying the first content in a first region in response to a first command, wherein the first region is different from a region in which the window is located;

wherein, when displaying the first content in the form of the window above second content in response to the receiver of screen projection being displaying the second content, the processor is further configured to perform operations of:

determining a window displaying region from a candidate region provided by the receiver of screen projection in response to the receiver of screen projection being displaying the second content, wherein the window displaying region is a region within the candidate region and is configured to display the window; and displaying the first content in the window displaying region and through the window above the second content; and wherein, when determining the window displaying region from the candidate region provided by the receiver of screen projection, the processor is further configured to perform operations of:

obtaining an image still rate of the second content in a candidate sub-region, wherein the candidate sub-region is a partial region within the candidate region, the image still rate is configured to indicate a ratio of a duration of an image being still to a statistical period;

determining a target sub-region in the candidate region, wherein the target sub-region is a candidate sub-region, which is within the candidate region and has a highest image still rate; and determining the window displaying region in the target sub-region.

15. The terminal according to claim 14, wherein the processor is further configured to perform, when executing the program instructions, operations of:

taking a camera arranged in the receiver of the screen projection to capture a gesture, generating the first command in response to the gesture conforming to a predetermined gesture template;

or taking a microphone arranged in the receiver of the screen projection to collect a voice, generating the first command in response to the voice conforming to a predetermined voice template;

or generating the first command in response to a predetermined operation performed for the window;

or displaying a mode switching control in a third region, generating the first command correspondingly in response to the mode switching control being triggered, wherein different mode switching controls correspond to different first commands.

16. The terminal according to claim 15, wherein when the first command is generated when the mode switching control is triggered, the mode switching control comprises one of a display swapping control and a splitting-screen display control.

17. The terminal according to claim 16, wherein the mode switching control comprises the display swapping control, and the processor is further configured to perform, when executing the program instructions, operations of:

controlling, in response to the first command, a region corresponding to displaying the first content to be swapped with a region corresponding to displaying the second content to allow the second content to be displayed in the form of the window above the first content.

18. The terminal according to claim 17, wherein the processor is further configured to perform, when executing the program instructions, operations of:

generating a second command in response to the mode switching control being triggered; and controlling the region corresponding to displaying the first content to be swapped with the region corresponding to displaying the second content in response to the second command to allow first content to be restored to be displayed in the form of the window above the second content.

19. The terminal according to claim 16, wherein the mode switching control comprises the splitting-screen display control, and the processor is further configured to perform, when executing the program instructions, operations of:

dividing, in response to the first command, a display screen of the receiver into the first region and a second region, wherein the first region and the second region are rectangular, and an area of the first region is greater than an area of the window and is smaller than an area of the second region;

remaining a ratio of a length of the first content to a width of the first content unchanged, displaying the first content in the first region; and remaining a ratio of a length of the second content to a width of the second content unchanged, and displaying the second content in the second region.

20. A non-transitory computer-readable storage medium, storing computer instructions, wherein the program instructions are configured to implement, when being executed by a processor, operations of:

receiving first content sent by an initiator of screen projection, wherein the first content is content provided by the initiator of screen projection;

displaying the first content in a form of a window above second content in response to the receiver of screen projection being displaying the second content; wherein the second content is content that is being displayed on the receiver of screen projector before the receiver of screen projector receives the first content; the second content is content that contains information and does not include a screen-off interface; when the first content is being displayed in the window on the receiver of screen projection the window covers at least part of the second content; and displaying the first content in a first region in response to a first command, wherein the first region is different from a region in which the window is located.

* * * * *